United States Patent [19]

Kelada et al.

[11] Patent Number: 5,443,721
[45] Date of Patent: Aug. 22, 1995

[54] FILTER CARTRIDGE MOUNTING ASSEMBLY

[75] Inventors: Maher I. Kelada, Pearland; Bruce J. Siberts, Surfside, both of Tex.

[73] Assignee: BASF Corporation, Mt. Olive, N.J.

[21] Appl. No.: 194,800

[22] Filed: Feb. 10, 1994

[51] Int. Cl.⁶ ............................................ B01D 27/08
[52] U.S. Cl. .................... 210/232; 210/455; 210/493.5; 210/497.01; 292/327; 55/502
[58] Field of Search ............... 210/232, 238, 435, 437, 210/438, 450, 451, 455, 457, 459, 493.1, 493.2, 493.5, 497.01, 497.2; 411/103, 106, 147, 378, 402; 292/2, 251, 307 R, 327, DIG. 53, DIG. 64; 55/502, 503, 504

[56] References Cited

U.S. PATENT DOCUMENTS

| | | | |
|---|---|---|---|
| 2,097,820 | 11/1937 | Lewis | 292/327 |
| 3,442,390 | 5/1969 | Petrucci et al. | |
| 3,546,853 | 12/1970 | Claar . | |
| 4,223,660 | 9/1923 | Lange . | |
| 4,248,017 | 2/1981 | Micallef . | |
| 4,353,580 | 10/1982 | Houck . | |
| 4,391,921 | 7/1983 | Johnson . | |
| 4,509,292 | 4/1985 | Konle . | |
| 4,559,688 | 12/1985 | Abu-Isa et al. | |
| 4,594,472 | 6/1986 | Brettle et al. | |
| 4,731,184 | 3/1988 | Ostreicher et al. | |
| 4,759,845 | 7/1988 | Selesnik . | |
| 4,810,379 | 3/1989 | Barrington | 210/497.01 |
| 4,866,118 | 9/1989 | Schaberg . | |
| 5,028,327 | 7/1991 | Ostreicher et al. | |
| 5,028,739 | 7/1991 | Keyser et al. | |
| 5,034,852 | 7/1991 | Rosenberg . | |
| 5,053,129 | 10/1991 | Kitson | 210/497.01 |
| 5,092,488 | 3/1992 | Pradel . | |
| 5,112,503 | 5/1992 | Raifman . | |
| 5,128,034 | 7/1992 | Kool . | |
| 5,149,431 | 9/1992 | Coen | 210/497.01 |
| 5,161,838 | 11/1992 | Ely et al. | 292/327 |
| 5,178,753 | 1/1993 | Trabold . | |
| 5,211,851 | 5/1993 | Meurer | 210/232 |
| 5,279,733 | 1/1994 | Heymans | 210/232 |

FOREIGN PATENT DOCUMENTS

| | | |
|---|---|---|
| 0476742A1 | 3/1992 | European Pat. Off. . |
| 2520083 | 7/1983 | France . |
| 4033653A1 | 4/1992 | Germany . |
| 2024092 | 1/1980 | United Kingdom . |
| 2044918 | 10/1980 | United Kingdom . |
| 2141841A | 1/1985 | United Kingdom . |

*Primary Examiner*—Robert A. Dawson
*Assistant Examiner*—W. L. Walker
*Attorney, Agent, or Firm*—Nixon & Vanderhye

[57] ABSTRACT

Mounting assemblies for filter cartridges include a sealing bolt having a threaded shank portion for being threadably engaged with one (upper) end of an interior apertured filter cartridge support post. A head portion of the bolt allows it to be turned manually by a suitable tool to assist in threadably interconnecting the shank and post. The other (lower) end of the support post is rigidly connected (e.g., via welding) to a lower external sealing cup-flange which sealingly bears against a lower end gasket associated with the filter cartridge. The sealing bolt is further provided with an upper sealing cup-flange positioned concentrically around the shank portion immediately below the head portion of the sealing bolt. An O-ring seal is embedded in the lower surface of the head portion so as to sealingly bear against the upper sealing cup-flange when the sealing bolt is threadably tightened with respect to the support post. The upper cup-flange is maintained in close proximity, but with slight clearance space (e.g., less than about 1/16"), to the O-ring seal by means of a stationary retaining ring seated in an annular groove in the shank portion of the sealing bolt.

20 Claims, 3 Drawing Sheets

FILTER CARTRIDGE MOUNTING ASSEMBLY

FIELD OF INVENTION

This invention is related to, and especially adapted to be useful in, the field of filter cartridges. In preferred forms, the present invention is embodied in a filter cartridge mounting assembly which includes a novel sealing device for effecting a fluid-tight seal with the filter cartridge, but which allows the filter cartridge to be easily removed from the mounting assembly when desired.

BACKGROUND AND SUMMARY OF THE INVENTION

Disposable and reusable filter cartridges are employed in a number of applications requiring fluid-filtration. In such applications, it is desirable for the filter cartridges to be easily removed from the associated mounting structures for purposes of replacement with fresh/clean filter cartridges. Furthermore, during use, the mounting structures are typically required to form a fluid-tight seal at the ends of the filter cartridge so that the fluid passes through the filtration media forming the cylindrical wall of the cartridge. Thus, any successful filter cartridge mounting assembly needs to mount the filter cartridge so as to form a fluid-tight seal without damaging the filter cartridge's ends.

Several proposals exist in the art to accomplish the purposes stated above. For example, in U.S. Pat. Nos. 5,028,327 to Ostreicher et al and 4,731,184 to Ostreicher et al, filter elements have a gasket which forms a seal with an edge of an inverted cup-shaped element. The cup-shaped element is apparently held in sealing contact with the gasket by means of a compression spring. Various threaded means have also been used in prior art mounting structures so as to secure a filter cartridge within a canister as can be seen, for example, form U.S. Pat. Nos. 3,442,390 to Petrucci et al, 3,546,853 to Claar, and 4,759,845 to Selesnick.

While the prior art proposals mentioned above are satisfactory, there still exists the need for improvement, especially in terms of cartridge sealing and removal efficiencies. It is towards supplying such a need that the present invention is directed.

Broadly, the present invention is embodied in a novel sealing device associated with a mounting assembly for filter cartridges. In this regard, the sealing device of the present invention includes a sealing bolt having a threaded shank portion for being threadably engaged with one (upper) end of an interior apertured cartridge support post. A head portion of the bolt allows it to be turned manually by a suitable tool to assist in threadably interconnecting the shank and post. The other (lower) end of the support post is rigidly connected (e.g., via welding) to a lower external sealing cup-flange which sealingly bears against the lower end gasket associated with the filter cartridge.

The sealing bolt is provided with an upper sealing cup-flange positioned concentrically around the shank portion immediately below the head portion of the sealing bolt. An O-ring seal is embedded in the lower surface of the head portion so as to sealingly bear against the upper sealing cup-flange when the sealing bolt is threadably tightened with respect to the support post. Furthermore, the upper cup-flange is maintained in close proximity, but with slight clearance space (e.g., less than about 1/16"), to the O-ring seal by means of a stationary retaining ring seated in an annular groove in the shank portion of the sealing bolt. Therefore, the upper sealing cup-flange is allowed to move freely around the shank portion of the sealing bolt, but is positionally maintained along the sealing bolt's length-wise axis by the retaining ring.

In such a manner, the sealing bolt is threadably interconnected easily with the support post and tightened sufficiently to form fluid-tight seals between the peripheral edge of the upper sealing cup-flange and the upper gasket of the filter cartridge, as well as between the O-ring embedded in the head portion and an adjacent surface portion of the upper sealing cup-flange. Furthermore, since the lower sealing cup-flange and support post constitute an integrally rigid structure, tightening of the sealing bolt will cause the peripheral edge of the lower sealing cup-flange to be compressed into fluid-tight sealing engagement with the lower gasket of the filter cartridge. Thus, the fluid-tight seals are achieved according to the present invention without damaging the filter cartridge's ends.

Further aspects and advantages of this invention will become more clear after careful consideration is given to the detailed description of the preferred exemplary embodiments thereof which follows.

BRIEF DESCRIPTION OF THE DRAWINGS

Reference will hereinafter be made to the accompanying drawings wherein like reference numerals throughout the various Figures denote like structural elements, and wherein.

DETAILED DESCRIPTION OF THE PREFERRED EXEMPLARY EMBODIMENTS

Figure 1:
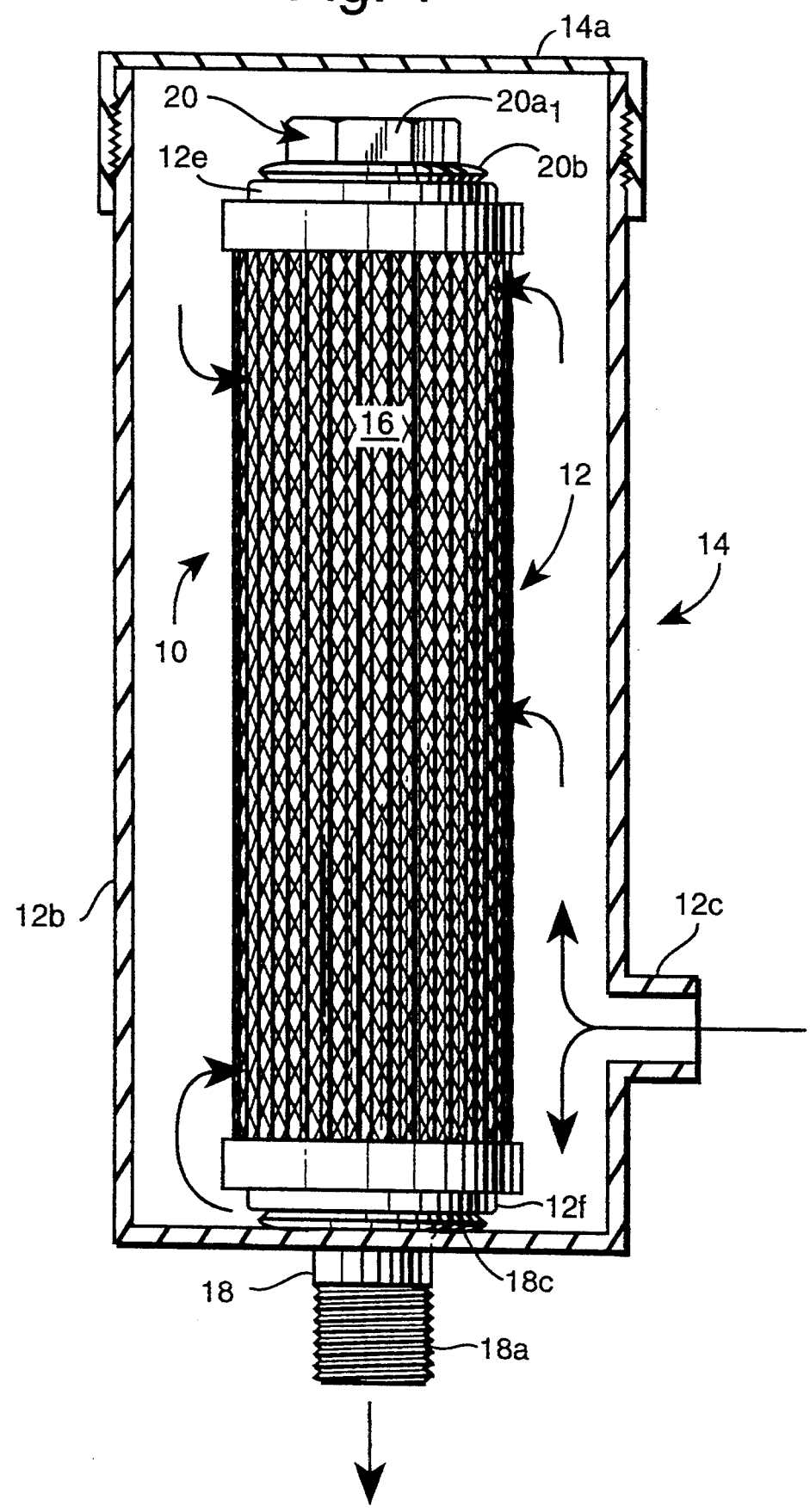
FIG. 1 is an elevational assembly view, partly in section, of a canister-type filter cartridge assembly in which the mounting assembly according to this invention may be employed.

Accompanying FIG. 1 depicts a filter cartridge assembly 10 (comprised of a cylindrical filter cartridge 12 and its associated mounting structures to be discussed in greater detail below) positioned within the interior of an enclosed canister 14. In this regard, the canister 14 can be associated operatively with virtually any equipment and/or process stream which requires fluid filtration.

The exemplary canister 14 shown in FIG. 1 is depicted as having a cap 14a which is threadably coupled to an upper end of the canister body 14b to allow access to the filter cartridge assembly 10. The canister 14 will have at least one fluid port 14c which admits fluid to be filtered into the interior space of the canister 14 and around the filter cartridge 12. The admitted fluid will then flow transversely thorough the filter media 16 of the filter cartridge 12 where it is filtered prior to being discharged through the discharge nipple 18a of tubular support post 18 (see also FIG. 2). The discharge nipple 18a may itself be threaded so as to be interconnected with suitable downstream equipment/process lines.

It will be understood that the description above is just one example of the manner in which a filter cartridge assembly 10 according to this invention may be employed in practice. Thus, virtually any suitable canister 12 can be employed instead of that depicted in accompanying FIG. 1. Furthermore, the flow of fluid to be filtered may be reversed to that shown in FIG. 1—i.e., the fluid may enter the interior space of the canister 12 via nipple 18a, flow through the filtration medium 16 and then be discharged through the fluid port 12c.

Figure 2:
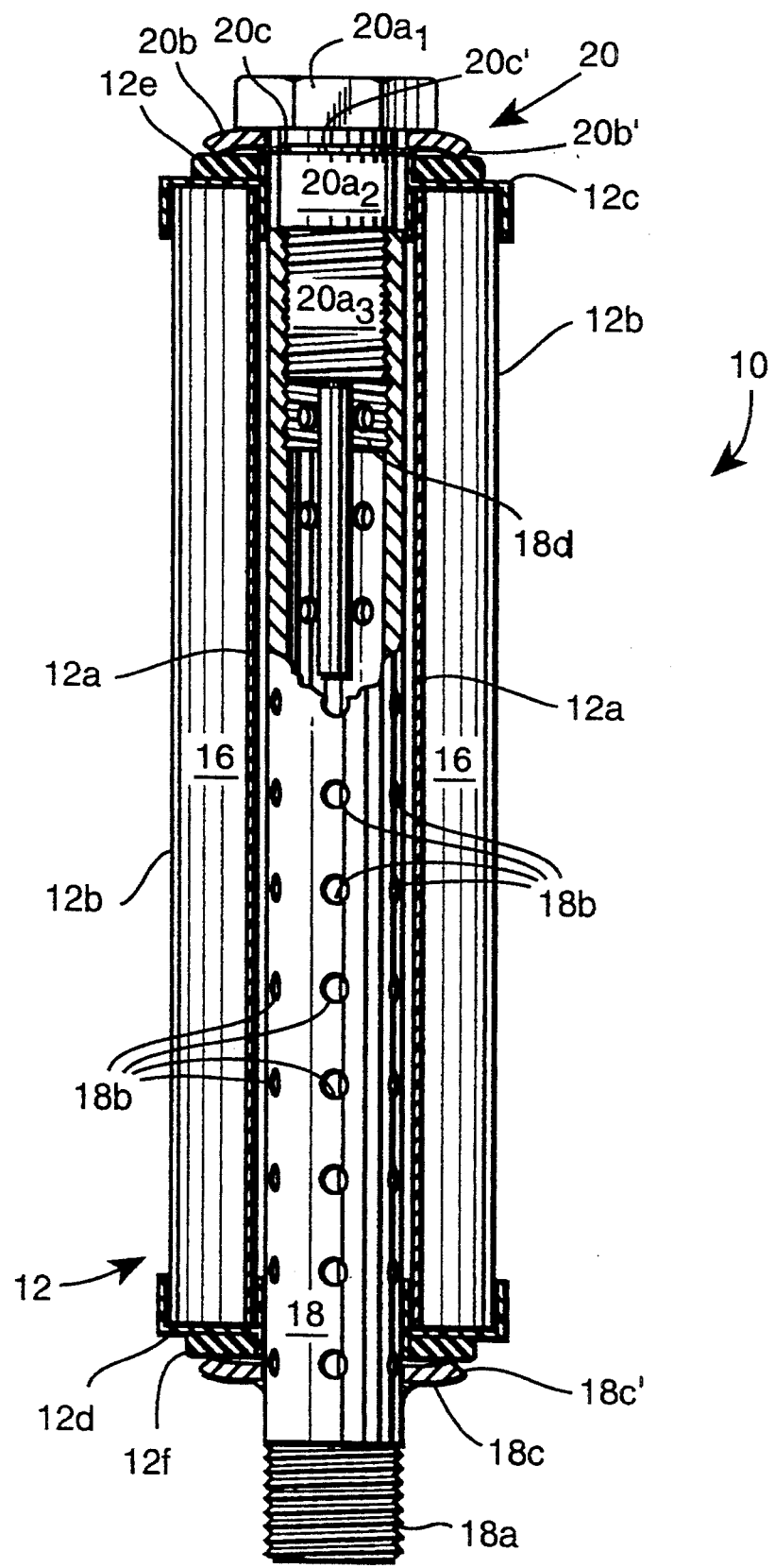
FIG. 2 is a cross-sectional elevational view of the filter cartridge mounting assembly according to the present invention.

The cartridge assembly according to the present invention is perhaps more clearly shown in accompanying FIG. 2. In this regard, it will be observed that the tubular support post 18 includes a plurality of apertures (a representative number of which are identified in FIG. 2 by reference numeral 18b) along its axial length. The exact size, location and/or number of apertures 18b will depend, for example, upon the fluid intended to be filtered. Suffice it to say, however, that the size, location and/or number of apertures 18b should be such that the pressure drop through the apertures 18a will not be excessively high.

The filter cartridge 12 that may be employed in the assembly 10 according to this invention is, in and of itself conventional. In this regard, the filter cartridge 12 will preferably have inner and outer cylindrical support members 12a, 12b, respectively, between which the filter medium 16 is sandwiched. The inner support member 12a may, for example, be formed of an apertured rigid thermoplastics material so as to prevent collapse of the filter medium 16, whereas the outer support member 12b may be in the form of a rigid or flexible open mesh material. The filter medium may be virtually any type conventionally employed for filtration of fluids, its specific selection being dependent upon the particular fluid intended to be filtered. Typically, however, the filter medium 16 will be in the form of a longitudinally pleated non-woven material, but other filtration media could likewise be employed, such as cellulosic, fibrous or open-celled foam materials to name just a few.

The cylindrical filter cartridge 12 is closed at each of its ends by means of upper and lower annular end caps 12c, 12d, respectively, which are preferably formed of a suitable thermoplastics material (e.g., nylon) and bonded to at least the inner support member 12a. Upper and lower annular gaskets 12e, 12f formed of a suitable elastomeric material are positioned on a respective end cap 12c, 12d so as to prevent fluid leakage between the end caps 12c, 12d and the tubular support post 18 at each end of the filter cartridge 12.

The lower end of the tubular support post 18 carries a lower sealing cup-flange 18c. The lower cup-flange 18c is most preferably rigid with the tubular support post 18, e.g., by means of welding, so that the support post 18 and cup-flange 18c form a rigidly integral structure. The lower cup-flange 18c includes a perimetrical edge region 18c' which is bent towards the adjacent gasket 12f. A fluid-tight seal is thereby formed between the perimetrical edge 18c' and the gasket 12f when the filter cartridge 12 is mounted for operation onto the support post 18 (as will be described in greater detail below).

Figure 3:
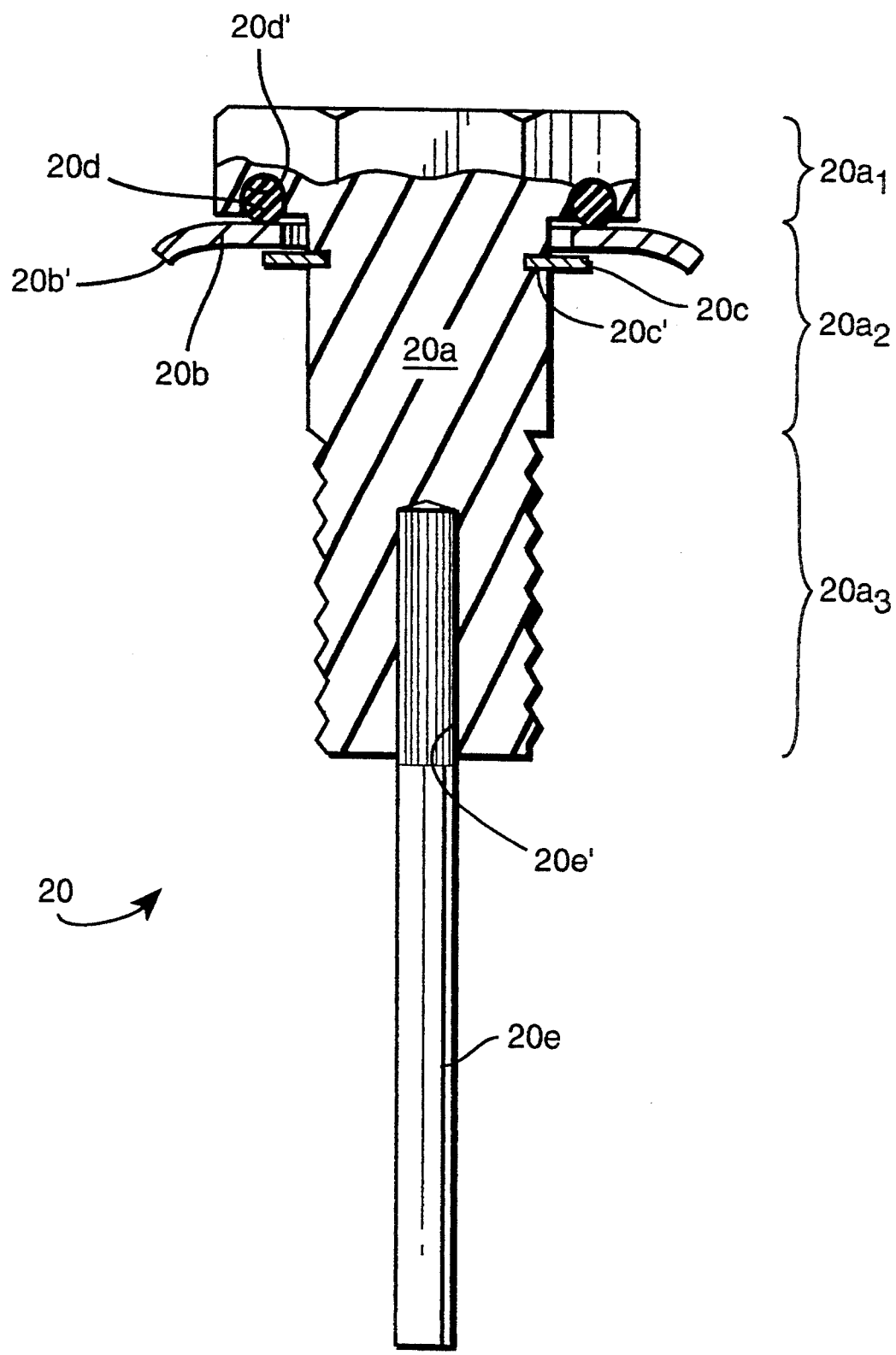
FIG. 3 is a detailed cross-sectional elevational view of the sealing bolt according to the present invention.

The filter cartridge 12 is tightly held in position by means of the sealing bolt subassembly 20, the structures of which are perhaps more clearly depicted in accompanying FIG. 3. As can be seen, the sealing bolt subassembly 20 includes a one-piece bolt member 20a comprised of an upper head portion $20a_1$ having a conventional hex-head form to allow engagement by a wrench or other suitable turning tool, a smooth upper shank portion $20a_2$, and a lower threaded shank portion $20a_3$ which is adapted to being threadably interconnected with the threads 18d formed on an inner surface as the upper end of the support post 18 (see FIG. 2).

An annular upper sealing cup-flange 20b concentrically surrounds the shank portion $20a_2$ closely adjacent to the lower surface of the head portion $20a_1$. The upper sealing cup-flange 20b is structurally similar to the lower cup-flange 18c attached rigidly to the support post 18 in that it includes a perimetrical edge 20b' bent towards the gasket 12e (see FIG. 2). Unlike the lower cup-flange 18c, however, the upper cup-flange 20b is not rigidly attached to the upper shank portion $20a_2$. Instead, the annular upper cup-flange 20b is freely rotatable around the shank portion $20a_2$ but is positionally maintained along the axis of the shank portion $20a_2$ by a stationary retaining ring 20c seated within an annular groove 20c' defined in the shank portion $20a_2$. The retaining ring 20c thereby positionally maintains the cup-flange 20b along the axis of the shank portion $20a_2$ in close proximity to (e.g., less than about 1/16" clearance space) the lower surface of the head portion $20a_1$. Most preferably, the retaining ring 20c is split so as to allow it to be removed from its seated relationship in groove 20c' and thereby allow removal of the cup-flange 20b.

An elastomeric O-ring seal 20d is disposed in an annular channel 20d' formed in the lower surface of the head portion $20a_1$ such that the O-ring 20d is embedded somewhat in the lower surface of the head portion $20a_1$, but is exposed sufficiently to form a fluid-tight seal with an subjacent region of the cup-flange 20b.

In use, a filter cartridge 12 will be coaxially positioned onto support post 18 while the sealing bolt subassembly 20 is removed. The sealing bolt sub-assembly will then be positioned relative to the support post 18 so as to allow the threaded shank portion $20a_3$ to be threadably engaged with the threads 18d formed in the terminal end of the support post 18. Since the terminal end of the support post 18 is hidden by the filter cartridge and/or may not be completely accessible due to surrounding equipment, a locator rod 20e is press-fit into a coaxially oriented recessed pocket 20e' at the terminal end of the threaded shank portion $20a_3$. The locator rod 20e thereby coaxially extends from the threaded shank portion $20a_3$ to assist in locating the support post 18 when the sealing bolt subassembly 20 is assembled therewith.

The sealing bolt subassembly 20 is thereby threadably interconnected with the support post 18 and may be tightened sufficiently to form fluid-tight seals between the peripheral edge 20b' of the upper sealing cup-flange 20b and the upper gasket 12e of the filter cartridge 12, as well as between the O-ring 20d embedded in the head portion $20a_1$ and an adjacent surface portion of the upper sealing cup-flange 20b. Furthermore, since the lower sealing cup-flange 18c and support post 18 constitute an integrally rigid structure, tightening of the sealing bolt subassembly 20 will cause the peripheral edge 18c' of the lower sealing cup-flange 18c to be compressed into fluid-tight sealing engagement with the lower gasket 12f of the filter cartridge 12.

Removal of the filter cartridge 12 is accomplished in a reverse manner. That is, the sealing bolt subassembly 20 is uncoupled and removed from the support post 18, after which the filter cartridge may simply be removed from its position surrounding the support post 18 and replaced with a fresh filter cartridge.

As is now apparent, the structures of this invention provide improvements in terms of cartridge sealing and removal efficiencies. However, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter cartridge mounting assembly comprising:
   a tubular support post for supporting the filter cartridge; and
   a sealing bolt subassembly coupled to one end of the tubular support post for sealing an adjacent end of the filter cartridge, said sealing bolt subassembly including;
   (i) a head portion;
   (ii) a threaded shank portion which is threadably coupled to said one end of the support post;
   (iii) a smooth shank portion defining an annular groove in close proximity to, but axially spaced from, said head portion;
   (iv) a retaining ring seated in said annular groove;
   (v) a sealing cup-flange surrounding said smooth shank portion between said head portion and said retaining ring; and
   (vi) an O-ring disposed between said head portion and said sealing cup-flange, wherein
   said sealing bolt is threadably tightened relative to said support post so as to cause fluid-tight seals to form between said cup-flange and said end of said filter cartridge, and between said O-ring and an adjacent surface of said sealing cup-flange.

2. A filter cartridge mounting assembly as in claim 1, wherein the other end of said support post has a second sealing cup-flange for sealing the other end of the filter cartridge.

3. A filter cartridge mounting assembly as in claim 2, wherein said second sealing cup-flange is integral with the other end of said support post.

4. A filter cartridge mounting assembly as in claim 1, wherein said support post is apertured.

5. A filter cartridge mounting assembly as in claim 1, wherein said sealing bolt further includes a locator rod coaxially extending from said threaded shank portion.

6. A filter cartridge mounting assembly as in claim 5, wherein said threaded shank portion includes a coaxial recessed pocket, and wherein said locator rod is press-fit into said coaxial recessed pocket.

7. A filter cartridge mounting assembly as in claim 1, wherein said retaining ring is split so as to be removable from said annular groove.

8. A filter cartridge mounting assembly as in claim 1, wherein said head portion includes a lower surface adjacent said cup-flange, and an annular channel formed in said lower surface, and wherein said O-ring is seated within said annular channel.

9. A filter cartridge mounting assembly as in claim 1, wherein said head portion includes surfaces which permit said head portion to be turned manually with a turning tool.

10. The combination comprising a filter cartridge, and a filter cartridge mounting assembly as in claim 1, wherein said filter cartridge is mounted on and coaxially surrounds said tubular mounting post.

11. The combination as in claim 10, wherein said filter cartridge includes a pair of annular end caps, and a cylindrical filter medium disposed between said end caps.

12. The combination as in claim 11, wherein said filter cartridge includes inner and outer coaxially disposed cylindrical supports extending between said pair of annular end caps, and wherein said filter medium is sandwiched between said supports.

13. The combination as in claim 12, wherein said filter medium is a longitudinally pleated non-woven material.

14. A sealing bolt subassembly adapted to being coupled to one end of a tubular support post of a filter cartridge mounting assembly and to thereby seal an adjacent end of a filter cartridge, said sealing bolt subassembly comprising:
   a head portion;
   a shank portion extending coaxially from said head portion, said shank portion defining an annular groove in close proximity to said head portion;
   a retaining ring seated in said annular groove;
   an annular sealing cup-flange coaxially surrounding said shank portion between said head portion and said retaining ring; and
   an O-ring disposed between said head portion and said sealing cup flange, wherein
   fluid-tight seals are formed between said cup-flange and an adjacent end of the filter cartridge, and between said O-ring and an adjacent surface of said sealing cup-flange when said sealing bolt subassembly is coupled to the tubular support post of the filter cartridge mounting assembly.

15. A sealing bolt subassembly as in claim 14, wherein said sealing bolt further includes a locator rod coaxially extending from said shank portion.

16. A sealing bolt subassembly as in claim 15, wherein said shank portion includes a coaxial recessed pocket, and wherein said locator rod is press-fit into said coaxial recessed pocket.

17. A sealing bolt subassembly as in claim 14, wherein said retaining ring is split so as to be removable from said annular groove.

18. A sealing bolt subassembly as in claim 14, wherein said head portion includes a lower surface adjacent said cup-flange, and an annular channel formed in said lower surface, and wherein said O-ring is seated within said annular channel.

19. A sealing bolt subassembly as in claim 14, wherein said head portion includes surfaces which permit said head portion to be turned manually with a turning tool.

20. A sealing bolt subassembly as in claim 14, wherein said shank portion includes an upper smooth shank portion, and a lower threaded shank portion.

* * * * *